United States Patent
Blanke-Bohne et al.

(10) Patent No.: US 7,753,089 B2
(45) Date of Patent: Jul. 13, 2010

(54) TANK FOR THE SAFE STORAGE OF A DANGEROUS LIQUID

(75) Inventors: Johannes Blanke-Bohne, Bochum (DE); Reinhold Marquardt, Gelsenkirchen (DE)

(73) Assignee: Thixo II GmbH, Bochum (DE)

( * ) Notice: Subject to any disclaimer, the term of this patent is extended or adjusted under 35 U.S.C. 154(b) by 1118 days.

(21) Appl. No.: 11/408,210

(22) Filed: Apr. 19, 2006

(65) Prior Publication Data

US 2006/0231560 A1  Oct. 19, 2006

(30) Foreign Application Priority Data

Apr. 19, 2005  (WO) ............... PCT/DE2005/000716

(51) Int. Cl.
*B65B 1/04* (2006.01)

(52) U.S. Cl. ................. 141/69; 141/104; 141/286; 141/363; 220/560.03; 220/564

(58) Field of Classification Search ........... 141/38, 141/67, 69, 100, 104, 231, 285–286, 363, 141/374, 383; 220/560.3, 564; 137/351
See application file for complete search history.

(56) References Cited

U.S. PATENT DOCUMENTS 4,857,111 A  8/1989  Haubennestel 7,578,323 B2 * 8/2009 Baehring et al. ............ 141/104

FOREIGN PATENT DOCUMENTS

DE  20011086 U1 * 1/2001
FR  1 391 004 A  3/1965

OTHER PUBLICATIONS

Macnine translation of DE20011086U1, pp. 1-2.*

* cited by examiner

*Primary Examiner*—Gregory L Huson
*Assistant Examiner*—Nicolas A Arnett
(74) *Attorney, Agent, or Firm*—Walter A. Hackler

(57) ABSTRACT

A tank (10) for storing a liquid with a device (11, 12) for feeding one or more substances thixotroping the liquid to the liquid in the tank (10) is characterised in that the device (11, 12) is designed so that it feeds the thixotroping substance or substances to the liquid in the tank (10) as a result of a signal from a signal transmitter, so that the liquid completely thixotropes, at least in a closed outer layer inside the tank (10) that cannot be penetrated by a residue of the liquid, not thixotroped if necessary. This ensures that by simple means the liquid present in the tank (10) is pretended from being discharged or from escaping under certain defined conditions, particularly in emergency situations.

9 Claims, 4 Drawing Sheets

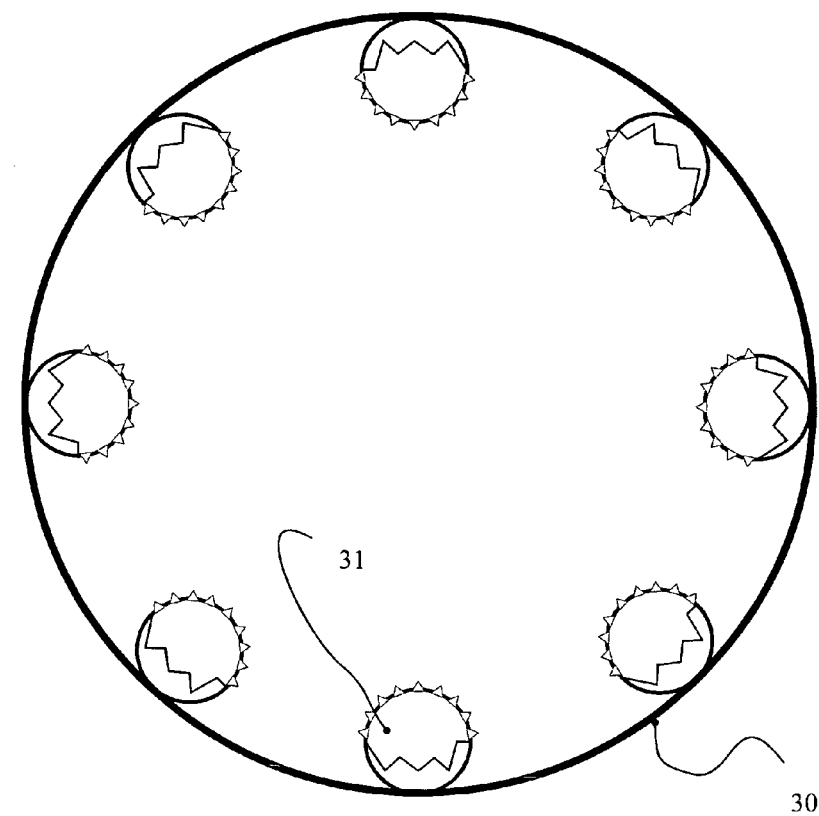
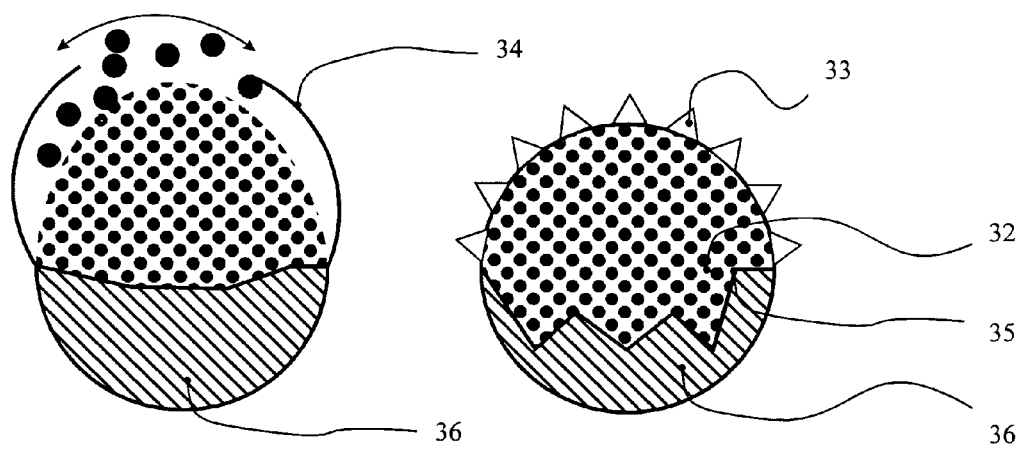
Fig. 3a
Fig. 3b          Fig. 3c

TANK FOR THE SAFE STORAGE OF A DANGEROUS LIQUID

This application claims Paris Convention priority of PCT/DE 2005/000716 filed Apr. 19, 2005 the complete disclosure of which is hereby incorporated by reference.

BACKGROUND OF THE INVENTION

The invention relates to a tank for the storage of a liquid with a device for feeding one or more substances thixotroping the liquid to the liquid in the tank. Such tanks are used in the chemical industry when liquids are to be solidified by the addition of a suitable agent (thixotropy) without any major temperature variation being required as in the case of solidification by freezing. A 2-component adhesive is similarly solidified, for example, but in this case the solidifying component is a hardener which gives rise to a generally irreversible solidification as a result of a chemical reaction with the first component, whilst in thixotropy solidification is caused by physical interaction of the components, which can also be reversed (re-liquefaction). DE 37 06 860 C2, for example, describes a thixotropic preparation using highly dispersive silicon oxide.

The handling of liquids in daily life may be associated with different risks. For example, an accident during the transport of dangerous liquid goods generally results in the dangerous goods escaping from the tank, and diversely contaminating the environment over a large area. In the case of combustible liquids an explosive flame may develop. DE 28 13 449 A1 discloses a device for sealing leakage points on tanks in which the medium escaping from the leakage point is solidified by means of a coolant by freezing the medium. However, the medium to be solidified must in this case be cooled to below its melting temperature. A thixotropy, i.e. rapid solidification of the dangerous liquids, could in such emergencies contribute to preventing disasters. The same also applies to the prevention of a fire or explosion of a fuel tank in vehicles which have been involved in an accident or to the prevention of environmental damage in the event of damage to a tanker at sea. A further example that could be mentioned is the accidental leakage from a slurry tank and the resultant environmental pollution.

Here too a more serious disaster could be avoided with the targeted initiation of a thixotropic "reaction". Even in the case of intrinsically harmless liquids, such as beer or wine, in a drink cellar, it may possibly be advantageous to prevent undesirable escape in large quantities from the container concerned, for example a barrel or tank, quickly and effectively.

It is therefore the underlying object of this invention to modify a tank of the type already described with the simplest possible agents so that the liquid contained in it is prevented from being discharged or from escaping under certain defined circumstances.

SUMMARY OF THE INVENTION

This object is achieved in accordance with the invention in that the device in the tank is designed so that it supplies the thixotroping substance or substances to the liquid in the tank, due to a signal from a signal transmitter, so that the liquid is completely thixotroped, at least in a closed outer layer inside the tank that cannot be penetrated by a residue of the liquid that is possibly not thixotroped. This layer may extend throughout the entire inner surface of the tank, but possibly also over an intrinsically closed partial area, for example as a sealing surface or plug at a point where the tank is damaged from the outside. Variants in which partial areas of the liquid are thixotroped in the volume of the tank are also conceivable, possibly in the form of solid honeycomb structures inside the residual liquid.

This can, for example, safely prevent combustible, explosive, toxic liquid, or liquid that otherwise pollutes the environment, from escaping from the tank in defined situations when the corresponding signal from the signal transmitter is present, since it is solidified, at least in its outer layer, by addition of the thixotroping substances. Instead of taking place completely in the outer layer only the thixotropy may also be carried out completely by adding the thixotroping substances also to the inside of the fluid volume to, thereby solidifying it. This also prevents undesirable escape of the liquid from the tank, but in this case the "through-reaction" inside the volume takes a much longer time than thixotroping the outer envelope only.

The modification of the tank according to the invention is particularly advantageous if the liquid in the tank is a dangerous product.

In an emergency, an accident can be prevented by means of the invention, particularly in the case of combustible and/or explosive liquids, but even if the liquid in the tank is corrosive and/or toxic, particularly an acid, lye or liquid toxic substances. This also applies when the invention is used in the case of environmentally harmful, in particular soil and/or groundwater contaminating liquids, for example slurry, liquid softeners, solvents and the like.

So that the presence of an emergency or even a looming accident can be safely detected, the signal transmitter is connected to one or more sensors which are capable of detecting corresponding risk situations in the case of particularly preferred embodiments of the tank according to the invention.

In the case of special developments of the embodiments the sensors are capable, depending on the application, of detecting positive or negative accelerations (e.g. in the event of a vehicle collision) and/or temperatures and/or temperature variations (e.g. at the beginning of a fire) and/or position changes of the tank or liquid in the tank (e.g. when the load in a transporter or tanker slides or is displaced) and/or variations in the liquid in the tank or leakage conditions of the tank and/or smoke or gas development in the area surrounding the tank.

In a further advantageous embodiment of the tank according to the invention, the signal transmitter is connected to a manual control element, particularly an emergency off transmitter, so that an operator can initiate the thixotropy "by hand" in an emergency.

A further preferred embodiment of the invention provides that the thixotroping substances are selected from the group of surface active metal oxides (=Aerosils®)), in particular $SiO_2$ and/or $TiO_2$ and/or $Al_2O_3$ and/or $ZrO_2$ and/or $Fe_2O_3$. Generally pyrogenic silicic acids are considered as amplifiers, i.e. metal oxides in pure form or as mixtures in the molecular level or as fine particles.

The thixotroping substances may be present, according to the application, in the form of powder, emulsion, gel, paste and/or a suspension. Finely divided surface-active solids with a particle size of less than 0.1 mm, preferably under 0.05 mm, are used in particular as thixotroping substances. The free surface of these particles is between 20 and 600 $m^2$ per gram of the substance. In this case the surface of the particles contains chemical groups which are capable of interacting with other substances. These groups may be part of the particles themselves, or may even be external substances which are either coupled solidly to the particles and are also associated by polar forces with the particles.

A particularly preferred embodiment of the tank according to the invention provides that the thixotroping substances are present in close spatial association with one or more carrier agents.

In the case of advantageous developments of this embodiment, the carrier agents may be designed as packaging for the thixotroping substances, the packaging automatically dissolving on contact with the liquid in the tank.

In especially preferred developments the carrier agents are designed, in particular, as textile mats, cushions, sponges or non-woven fabrics in which the thixotroping substances are absorbed. In particular, the carrier agents can be impregnated with the thixotroping substances. The mats, cushions, sponges or non-woven fabrics preferably contain chambers in which a reaction resin and/or components of the same are accommodated, where the reaction resin and its components give rise to a setting reaction on contact with the liquid in the tank. When the carrier agents are rolled or spread out on the basis of the signal from the signal transmitter, the contents of the chambers mix with the surrounding liquid in the tank, initiating the setting reaction. The setting time may be set by a suitable choice of type of quantity of reaction accelerators so that setting is completed a short time after rolling out the mats. The properties of the setting resin are selected so that a hard product results. This gives rise to additional stabilisation of the thixotroped liquid. If the mats are arranged in the vicinity of the tank walls, any liquid escaping because of a leak in the tank forces the mats against the damaged point. This provides an additional mechanical seal which, together with the initiating thixotropy, prevents further leakage of liquid.

Alternatively, however, the thixotroping substances may also be present as tablets, chips or granulate.

The feeding of thixotroping substances into the liquid in the tank may take place mechanically, electrically, magnetically or pneumatically, for example by gas pressure, by means of pumps or other suitable devices.

To achieve a rapid, comprehensive thixotropic reaction when necessary, it is advantageous for the device for feeding the thixotroping substances to incorporate a device for distributing the thixotroping substances in the liquid in the tank under the influence of an external force.

The distributing device may, in certain embodiments, consist of one or more initially closed envelopes in which the thixotroping substances are arranged so that they are fed to the liquid in the tank when the envelope is opened.

What is particularly advantageous is a development in which the envelope is freely movable in the liquid inside the tank and is provided with sensorics and an automatic control device. The envelope can therefore move around in the liquid in the nature of an automatic submarine and effectively distribute the thixotroping substances.

In embodiments supplementary or alternative to this, the device for distributing the thixotroping substances incorporates a stationary pipe and/or nozzle system arranged in the tank, where, in the presence of a signal from the signal transmitter, the thixotroping substances are fed into the liquid in the tank by means of pressure gradients. The nozzles or outlet openings of the pipes are preferably arranged on the insides of the tank walls so that at least a closed outer layer of thixotroped substance can be produced in the manner of a cocoon or encapsulation from a residue of the liquid that is not thixotroped, if necessary.

Since great speed is required in emergency situations to prevent a major accident, the device for feeding thixotroping substances to the fluid in the tank and/or the nature and particle size of the thixotroping substances, is chosen in particularly preferred embodiments of the invention so that when a signal from the signal transmitter is present, thixotropy of the liquid takes place in a closed outer layer within less than one hour (for example after damage to a tanker at sea), and in particular within less than 5 minutes (for example, when a leak from a larger tank commences), but preferably within less than 2 seconds (in the case of road traffic accidents).

In order to be able to reverse the thixotropy in the particular application, if necessary, a device for feeding surface-active agents, particularly tensides, is provided in a particularly preferred embodiment of the tank according to the invention, for re-liquefaction of thixotroped material.

The tank according to the invention may be connected permanently or detachably to a land vehicle, water vessel or aircraft.

In a particularly preferred development of these embodiments, particularly in connection with motor vehicles, the signal transmitter may be a device for releasing an airbag system of the vehicle, in which case simply the releasing signal for the airbag, which by definition is of course an indication of an accident involving a collision of the vehicle, is at the same time used as an emergency signal for triggering the thixotropic reaction.

The tank according to the invention may also be arranged stationarily, instead of on or in a vehicle, for example a chemical tank in a factory or a large slurry tank on a farm.

The tank according to the invention may be open at the top or designed as a closed tank.

Alternatively the tank may have openings through which the liquid flows. In particular, the tank may be a container in the form of a pipeline.

An embodiment of the tank according to the invention, in which one or more adhesive agents are added, is more particularly preferred. This gives rise to permanent adhesion of the thixotroped layer on the corresponding inner surface of the tank, thus ensuring that no fluid is able to escape from the inside of the tank.

In advantageous developments of this embodiment, adhesive agents such as polyalcohols and/or polysaccharides and/or polycarbonic acids and/or their salts and/or esters of the inorganic acids, in particular esters of the acids of sulphur and/or phosphorus, may be provided.

As already mentioned, the completely thixotroped closed outer layer may extend inside the tank throughout the entire inner surface of the tank in certain embodiments of the invention.

In alternative embodiments, the completely thixotroped closed outer layer inside the tank may extend over an intrinsically closed partial area of the inner surface of the tank, particularly as a sealing surface or plug at a point where the tank is damaged. The thixotropy of the liquid in the tank is therefore carried out specifically where it is needed.

Embodiments of the invention have also been mentioned above in which the device for feeding thixotroping substances is designed so that the spatial partial areas of the liquid in the volume of the tank can be thixotroped, particularly in the form of solid honeycomb structures within the residual fluid. For example, sufficient inner stability can therefore be imparted to a tank that has run aground on a reef to prevent it from breaking up and sinking in rough sea. The liquid cargo can therefore be prevented from escaping using the methods described above.

What is preferred is a method for operating a tank according to the invention which is characterised in that if a signal from the signal transmitter is present, the liquid in the tank is completely thixotroped. The liquid may, for example, be the fuel in the tank of a vehicle, and the event triggering the signal may be an accident. This will then prevent an even worse situation, such as a fire or an explosion.

What is of major significance, economically, is a method variant in which the thixotroped substance is partially thixotroped, prophylactically, even before a signal is transmitted from the signal transmitter. This is recommended, for example, during planned transport of dangerous goods, for example after the loading of a tanker.

In a first alternative of this method variant the liquid is homogeneously partially thixotroped, increasing the viscosity of the liquid, which on the one hand makes leakage considerably difficult and delays it in an emergency, in contrast to the volatile condition, and on the other hand shorts the time required for "through-reacting", i.e. the carrying out of complete thixotropy when a dangerous situation arises, which will be indicated by the signal from the signal transmitter.

A second alternative is characterised in that an outer solid layer is produced as a result of the partial thixotropy of the liquid, said layer surrounds a core of residual liquid. This would, for example, certainly create a "third envelope" in the case of a modern double envelope tanker, which provides, for example, additional protection against an environmental disaster due to leaking oil or the like if the tanker runs aground on a reef.

A method variant in which the tank is filled with liquid, complete or partial thixotropy of the liquid in the tank is subsequently carried out by actuating the signal transmitter, the tank is freighted to a destination spatially distant from the place of filling, the thixotroped substance re-liquefied, and the liquid drained from the tank, is suitable as a standard method. A much greater degree of safety for people and the environment can be achieved in this manner by using the tank according to the invention specifically in the transport of dangerous goods.

Finally, another advantageous variant of the method according to the invention, for operating a tank according to the invention, is characterised in that the tank is filled with liquid and full thixotropy of honeycomb-shaped partial areas of the liquid in the tank, particularly of solid hexagonal honeycomb structures, is subsequently effected by actuating the signal transmitter. As mentioned above, this may impart to a tanker that has got into distress, for example, sufficient inner stability to prevent the hull from breaking up and the vessel from sinking.

Further advantages of the invention can be extracted from the description and the drawing. The features mentioned above and below can be used individually or collectively in arbitrary combination. The embodiments shown and described are not to be understood as exhaust enumeration but have exemplary character for describing the invention.

BRIEF DESCRIPTION OF THE DRAWING

FIG. 3a shows a variant of the invention, with a pipe system;

FIG. 3b shows an opening pipe section from the variant according to FIG. 3a;

FIG. 3c shown an opening pipe section from the variant according to FIG. 3a also showing nozzles for injecting thixo material.

DESCRIPTION OF PREFERRED EMBODIMENTS

An emergency may be detected automatically by suitable sensorics (e.g.: acceleration transducer, position indicator etc.), or such detection may also be initiated by a person, by pressing a button (emergency off). The emergency detection system is integrated in the on-board computer of the tank monitoring system (if possible an independent computer unit). From here the release process is transmitted to the intelligent part of the thixo variants, possibly by remote control. The adjusting and switching units are subsequently actuated and the thixotropy process started.

Dangerous Goods Tank

Dangerous goods tanks or containers may include all stationary and moving systems in which dangerous goods are stored. Examples: road tankers, rail tank cars, fuel tanks in motor vehicles, ships and aircraft, tankers in ocean-going and inland shipping, fuel oil tanks, and storage tanks for dangerous goods.

Thixotroping Material

Thixotroping substances are capable of solidifying liquids to prevent leakage or undesirable dispersal over large areas or spaces in the surrounding environment. Thixotroping substances are present in the form of dust, but may also be mixed in liquids.

Re-liquefaction and Surface-active Agents

Surface-active agents are capable of converting solidified liquids to their original liquid form by thixotropy. The thixotroping substances and surface-active agents supplied may be regained in the process by filtration or distillation, for example.

Thixo Mats

These act as carriers of thixotroping substances. They may be pressed in dry or may already be saturated in liquid form. The mats may be manufactured of plastic—unwoven fabric. They may be interspersed with plastic filaments or thin metal wires or meshes, thereby enabling the tensile stress to be increased. Thixo mats can be rolled, folded and may conceivably be in the form of an "endless belt".

A special embodiment comprises mats with small capsules with thin plastic skins (cf.blister film for packing purposes), which are destroyed by a build-up of released pressure, in order to release the thixo agent. This enables the agent to be distributed specifically. Capsules with skins which dissolve in the dangerous goods are also conceivable.

Folding Thixo Mats

If thixo mats are to be given geometric stability, e.g. because they are to be folded, the mat is provided with a metal frame having desired mechanical properties (e.g. foldable or movable by means of a pull rope).

Figure 1:
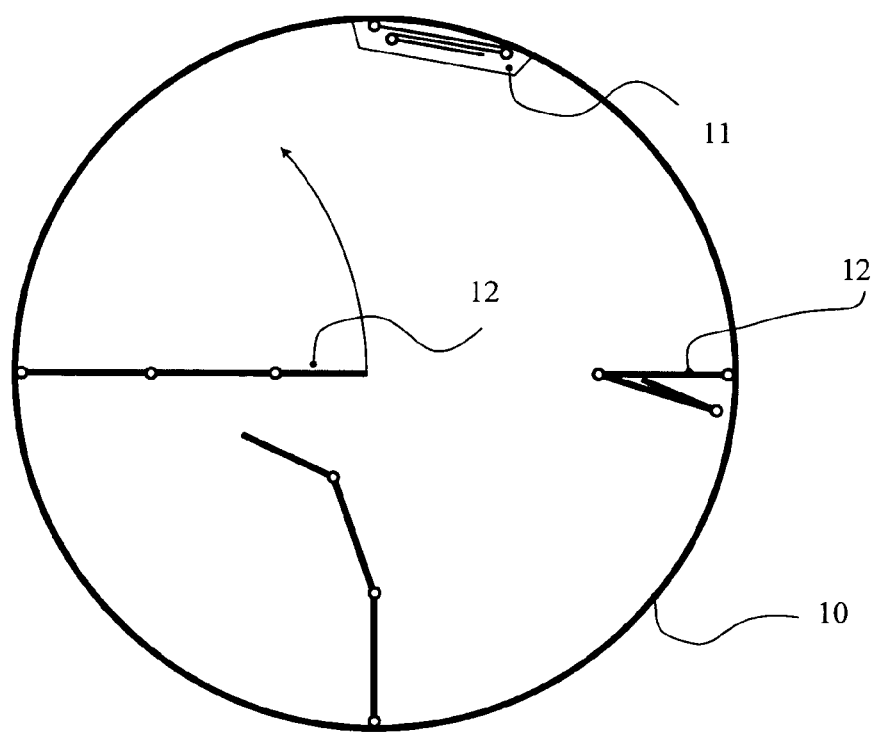
FIG. 1 shows an embodiment of the tank according to the invention with closed pocket and folding thixo mats.

Pocket Variant (FIG. 1)

As shown diagrammatically in FIG. 1, pockets 11, in which folding thixo mats 12 are housed in the folded condition, are fitted to the wall of a tank 10. In case of danger pockets 11 open and folding thixo mats 12 unfold, according to how many folding mats are required to reach the middle of the tank. During the folding process the thixo agents are released to the dangerous goods and are therefore distributed as homogeneously as possible in the dangerous goods.

Figure 2:
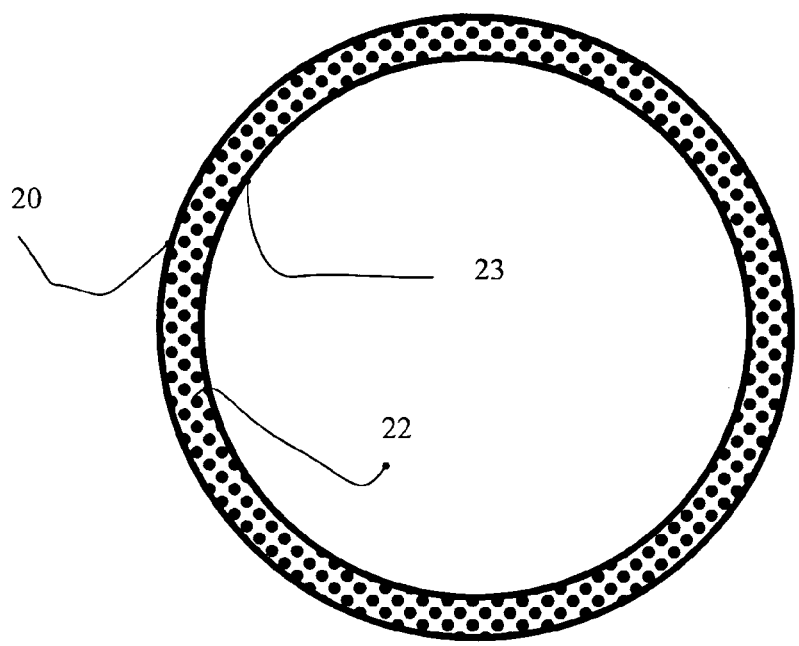
FIG. 2 shows a variant of the invention with a double envelope tank.

Double Tank Variant (FIG. 2)

The wall of a container 20 shown in FIG. 2, generally of a tank, is of a double-wall design. Here the inner wall 23 may possibly consist of plastic. Thixo material 22 is inserted in the intermediate space between the two walls. In the case of local damage (attack or puncture with lance-shaped objects), the locally limited area is advantageously solidified by the thixo agents 22 in the manner of a plug.

Pipe System Variant (FIG. 3a-c)

This variant is shown diagrammatically in FIGS. 3a to 3c, and is considered mainly for newbuilding of tank containers. A split pipe 31 contains a flexible diaphragm 35 in the longitudinal direction. Diaphragm 35 separates a high pressure section 36 from a magazine section for thixo agent 32. Nozzles 33, which can inject thixo material 32 in different directions into the dangerous goods at certain distances. Diaphragm 35 may generally already be under a certain initial tension, so that in the high pressure section 36 a slight increase in pressure is all that is needed to force thixo material 32 through nozzles 33. Nozzles 33 are only opened if a certain initial pressure is exceeded, then remain open. They may possibly re-close with a certain hysteresis, or they have a return characteristic. The pipe distribution is adapted so that a fixed jacket is formed around any liquid inner core that may remain.

A further variant of the pipe system, not shown in the drawing, is constructed so that two pipes (or partial pipes), one lying inside the other, disclose empting slots by rotation (e.g. ¼ turn, spice spreader principle). Here too thixo agent 32 may be kept under initial pressure by a flexible diaphragm 35.

However, it is also possible to fold up the magazine section, in which case thixo material 32 is forced out by diaphragm 35 under initial tension. In this variant, shown in FIG. 3b, pipe 31 is provided with a folding outer wall 34 instead of nozzles 33 shown in FIG. 33.

Figure 4:
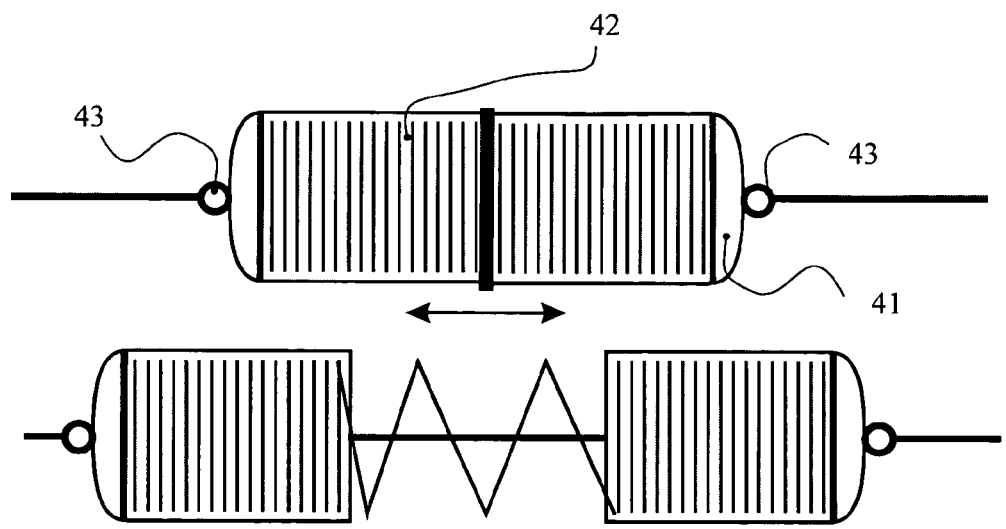
FIG. 4 shows a variant of the invention with separating envelopes in the closed condition (top) and in the open condition (bottom)
Figure 5:
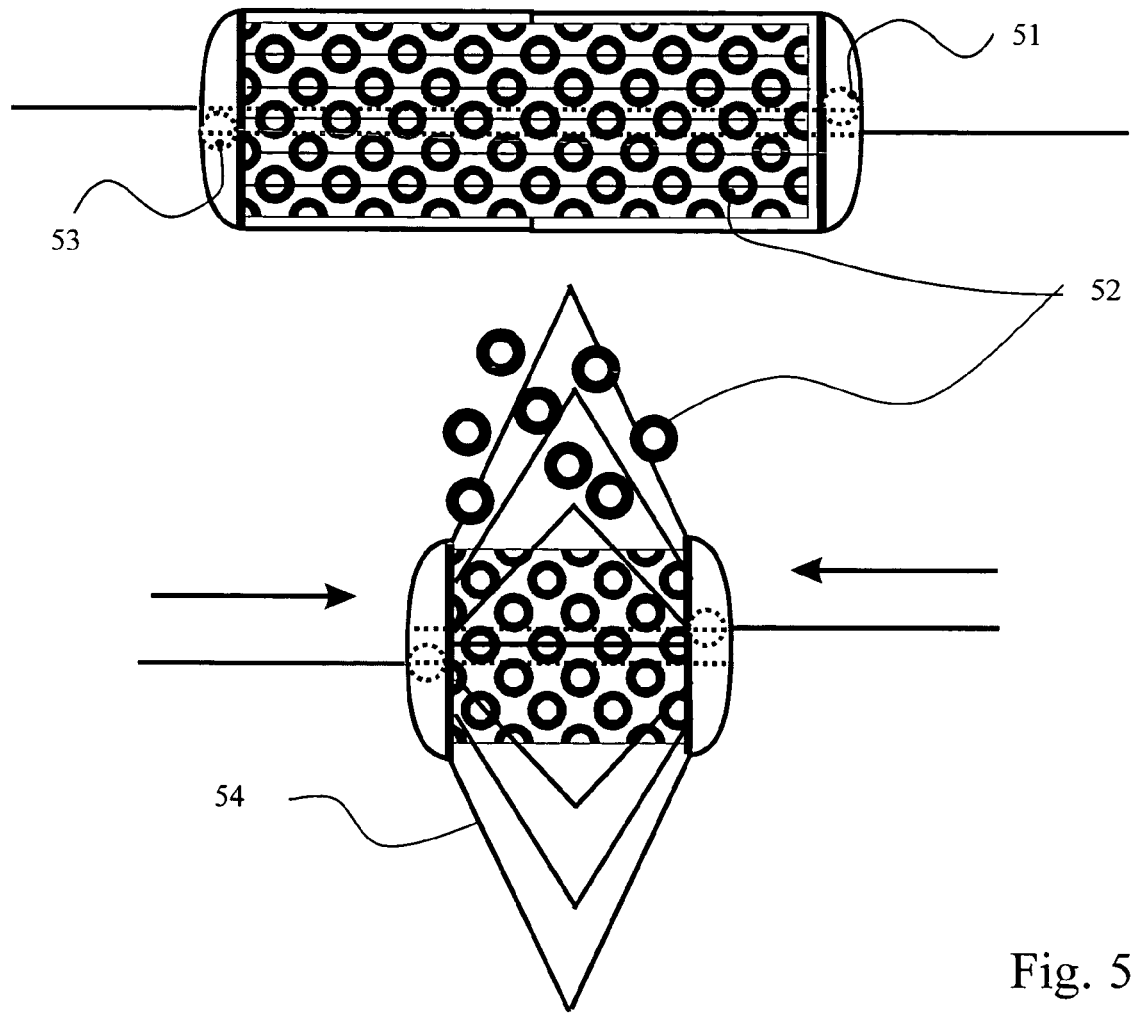
FIG. 5 shows a variant of the invention with an articulated sleeve in the closed condition (top) and in the open condition (bottom)
Figure 6:
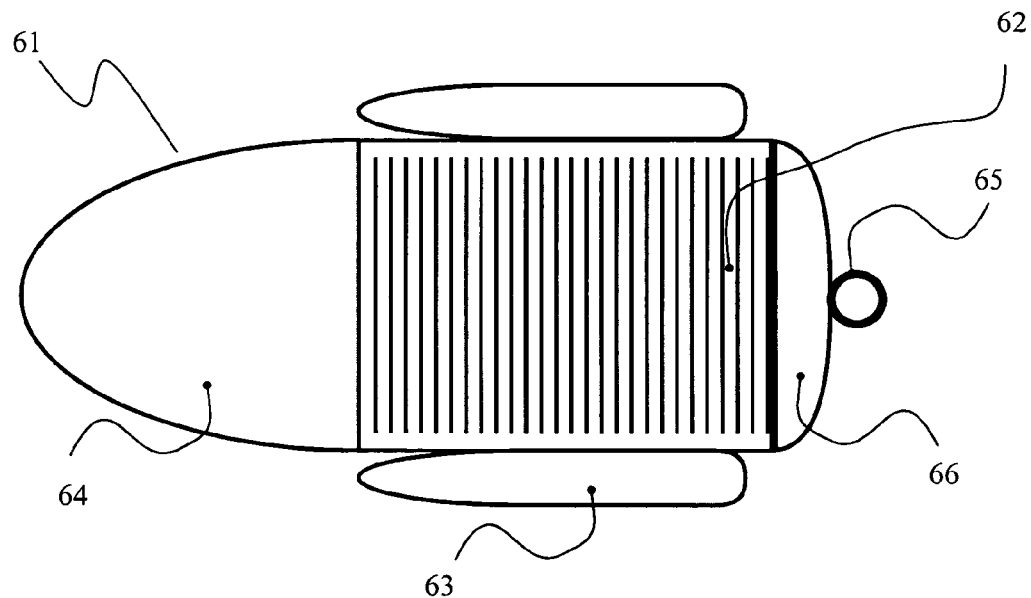
FIG. 6 shows a variant of the invention with a submarine-type immersion device.
Figure 7:
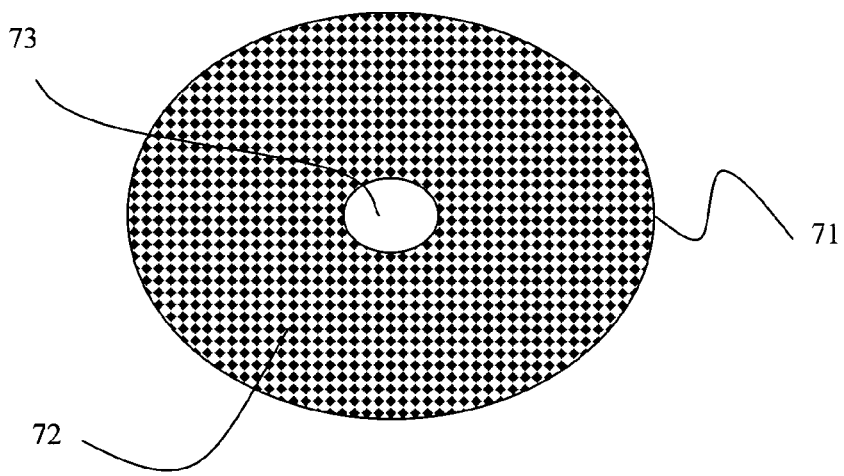
FIG. 7 shows a variant of the invention with a falling weight in a ball-shaped envelope.

Sleeve Variants (FIGS. 4 and 5)

The advantage of this variant is that very few modification actions are required on the tank installations.

As shown in FIG. 4, endless thixo mats 42 can be accommodated in a split sleeve 41, folded and pressed. Both sleeve chambers may be of the same or different sizes. However, it may also be appropriate to form only one chamber, this being dependent on the point of installation in the dangerous goods tank.

Thixo sleeve 41 may be pulled by means of lugs 43 with a pull rope horizontally through the dangerous goods (or may move by its own drive on the rope). Here sleeve 41 opens (e.g. by generating pressure with nitrogen tablets), and the stack of thixo mats 42 is peeled off and in doing so distributes the thixo agent in the dangerous goods. A drive may be installed in the head of sleeve 41, which drive moves sleeve 41 automatically on the rope. The drive may be achieved electrically (battery), but also pneumatically, in which case the pressure required can be generated by nitrogen tablets, for example.

Thixo sleeve 41 may, however, also be allowed to drop vertically through the dangerous goods. Here a head of sleeve 41 is secured by an adhesive magnet or on one of lugs 43 on the tank container, and detached from the main section of sleeve 41 (e.g. bayonet closure or screw connection). The second sleeve section, with thixo mat stack 42, is allowed to drop into the dangerous goods. The associated sleeve head may contain a failing weight to accelerate this process. The stack is peeled off during falling and distributes the thixo agent evenly. No structural actions on the tank are required for this application.

Both of the variants above may also be designed so that several sleeves 41 are fitted on a rope, which sleeves are all opened at the same time by pulling.

If no thixo mats 42 are to be used, the thixotroping substances (thixo dust or liquid) may also be forced out by a ram (two ropes pulled in opposite directions).

Another construction of sleeve 51, shown in FIG. 5, may be designed so that the jacket of sleeve 51, perforated in strips, for example, breaks open on the outside due to pressure (articulated sleeve), by shortening the cylindrical axis and collapsing strips 54 formed. However, the breaking open of such a sleeve 51 may also be triggered by igniting nitrogen tablets (generation of inner pressure, bursting sleeve). Sleeve 51 may be again conveyed through the tank by a rope fitted to a lug 53.

"Submarine" Variant (FIG. 6)

A further variant is a sleeve-shaped submersible device 61 moving independently, shown in FIG. 6, which device is navigated on online calculated trajectories through the dangerous goods. Here sensorics, electronics and a microcontroller are required, represented diagrammatically as control head 64. The "submarine" must have its own drive and must be manoeuvrable in all directions. The drive and steering unit are denoted by lateral fins 63. The sensorics must be able to record their on position and the geometry of the tank. This variant is appropriate when very large tanks (ship cargo) are to be inoculated with thixo agents. In the embodiment shown, endless non-woven fabric mats 62 are provided with pressed-in thixo agent in submersible device 61.

In other embodiments the "submarine" may also be fitted on rear cover 66 with nozzles, the thixo material being ejected in the form of dust or a liquid. A fixing lug 65 on rear cover 66 may serve for docking.

Here too no structural modifications to the tank are required. The "submarine" may be used flexibly because it is transportable. If, for example, an oil tanker gets into distress, such a "submarine" may still possibly be deployed by helicopter.

Ball Variant with Falling Core (FIG. 7)

Finally a further extremely simple variant comprises a ball-shaped capsule 71, which is filled with thixotroping substances 72, and carries inside a heavy falling core 73, which allows capsule 71, after it has been thrown in, to drop relatively quickly down through the liquid in the tank, initially because of the gravitation, in which case capsule 71 is able to release thixo material 72 into the surrounding liquid in the tank.

We claim:

1. A tank for storing a liquid and a device for feeding one or more thixotroping substances, to the liquid in the tank, wherein the device feeds the thixotroping substance, or substances, to the liquid in the tank as a result of a signal, so that the liquid thixotropes, at least in a closed outer layer inside the tank, that cannot be penetrated by a residue of the non-thixotroped liquid, the thixotroping substances being present in close spatial connection with one or more carrier agents, wherein with the carrier agents are textile mats, cushions, sponges, or non-woven fabrics.

2. The tank according to claim 1, wherein the thixotroped closed outer layer inside the tank extends throughout the whole inner surface of the tank.

3. The tank according to claim 1, wherein the thixotroped closed outer layer inside the tank extends over an intrinsically closed partial area of the inner surface of the tank, as a sealing surface or plug at a point where the tank is damaged.

4. The tank according to claim 1, wherein the device for feeding thixotroping substances is designed so that spatial partial areas of the liquid in the volume of the tank can be thixotroped.

5. The tank according to claim 1, wherein the thixotroping substances are selected from the group of surface active metal oxides consisting of, $SiO_2$ and/or $tiO_2$ and/or $Al_2O_3$ and/or $ZrO_2$ and/or $Fe_2O_3$.

6. The tank according to claim 1, wherein in that the carrier agents are impregnated with the thixotroping substances.

7. The tank according to claim 1, wherein the mats, cushions, sponges or non-woven fabrics have chambers containing a reaction resin and/or components of the same, wherein the reaction resin and its components give rise to a setting reaction on contact with the liquid in the tank.

8. The tank according to claim 1, wherein the device for feeding thixotroping substances to the liquid in the tank and/or the type and particle size of the thixotroping substances are chosen so that in the presence of a signal, thixotropy of the liquid takes place in a closed outer layer in less than one hour.

9. The tank according to claim 1, wherein one or more adhesive agents are added to the thixotroping substances, these adhesive agents being, polyalcohols and/or polysaccharides and/or polycarbonic acids and/or esters of the inorganic acids, esters of the acids of sulphur and/or phosphorus.

* * * * *